United States Patent
Kim et al.

(10) Patent No.: US 11,807,237 B2
(45) Date of Patent: Nov. 7, 2023

(54) VEHICLE CONTROL SYSTEM

(71) Applicant: TOYOTA JIDOSHA KABUSHIKI KAISHA, Toyota (JP)

(72) Inventors: Jonggap Kim, Hadano (JP); Hiromitsu Metsugi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 232 days.

(21) Appl. No.: 17/473,115

(22) Filed: Sep. 13, 2021

(65) Prior Publication Data
US 2022/0111844 A1 Apr. 14, 2022

(30) Foreign Application Priority Data
Oct. 9, 2020 (JP) ................................ 2020-171016

(51) Int. Cl.
*B60W 50/06* (2006.01)
*B60W 30/18* (2012.01)
*B60W 10/18* (2012.01)

(52) U.S. Cl.
CPC ...... *B60W 30/18109* (2013.01); *B60W 10/18* (2013.01); *B60W 50/06* (2013.01); *B60W 2520/105* (2013.01); *B60W 2540/106* (2013.01); *B60W 2540/12* (2013.01)

(58) Field of Classification Search
None
See application file for complete search history.

(56) References Cited

U.S. PATENT DOCUMENTS

| | | | |
|---|---|---|---|
| 10,858,010 B2* | 12/2020 | Kujubu | B60T 8/3205 |
| 2016/0214609 A1* | 7/2016 | Yamaoka | B60Q 9/00 |
| 2017/0361851 A1* | 12/2017 | Takeya | B60W 30/18181 |
| 2018/0186352 A1* | 7/2018 | Goto | B60T 8/17 |
| 2018/0244157 A1* | 8/2018 | Hirakawa | B60W 30/18109 |
| 2018/0244158 A1* | 8/2018 | Komatsu | B60W 10/18 |
| 2020/0130673 A1 | 4/2020 | Suzuki | |
| 2021/0039504 A1* | 2/2021 | Umetsu | B60W 20/15 |
| 2021/0354621 A1* | 11/2021 | Son | B60W 30/18127 |
| 2022/0063626 A1* | 3/2022 | Kaneko | B60W 30/143 |
| 2022/0097700 A1* | 3/2022 | Semenov | B60W 50/085 |
| 2022/0105925 A1* | 4/2022 | Naserian | B60L 7/18 |

FOREIGN PATENT DOCUMENTS

| | | |
|---|---|---|
| JP | H09-95222 A | 4/1997 |
| JP | 2001-219830 A | 8/2001 |
| JP | 2010-76584 A | 4/2010 |
| JP | 2015-229405 A | 12/2015 |
| JP | 2020-067041 A | 4/2020 |
| JP | 2020-100349 A | 7/2020 |
| JP | 2021-109627 A | 8/2021 |

* cited by examiner

*Primary Examiner* — James M McPherson
(74) *Attorney, Agent, or Firm* — Oliff PLC (57) ABSTRACT

A vehicle control system configured to control deceleration of a vehicle properly according to a driver's intention in one-pedal mode. In the one-pedal mode, a controller controls deceleration of the vehicle based on a deceleration level set in accordance with a speed of the vehicle. If the brake pedal is manipulated to decelerate the vehicle while the vehicle is operated in the one-pedal mode and an operating amount of an accelerator pedal falls within the decelerating range, the controller updates the deceleration level based on an operation of the brake pedal.

5 Claims, 9 Drawing Sheets

VEHICLE CONTROL SYSTEM

CROSS REFERENCE TO RELATED APPLICATIONS

The present disclosure claims the benefit of Japanese Patent Application No. 2020-171016 filed on Oct. 9, 2020 with the Japanese Patent Office, the disclosure of which are incorporated herein by reference in its entirety.

BACKGROUND

Field of the Disclosure

Embodiments of the present disclosure relate to the art of a vehicle control system configured to control a drive force and a brake force in response to an operation of a pedal, and more particularly, to a vehicle control system configured to propel a vehicle in a one-pedal mode in which a drive force and a brake force are controlled by manipulating one pedal.

Discussion of the Related Art

JP-A-H09-95222 describes a deceleration adding device for a vehicle configured to apply brake force directly to a main brake system, and to gradually decelerate the vehicle by applying an assist brake force to the vehicle. The deceleration system described in JP-A-H09-95222 comprises a brake force applying mechanism that applies a brake force to the main brake system. According to the teachings of JP-A-H09-95222, a stroke range of an accelerator pedal is divided into a decelerating range, a coasting range, and an accelerating range, and the deceleration adding device detects a position of the accelerator pedal. When the accelerator pedal position is positioned within the deceleration range, the brake force applying system is actuated to apply brake force to the main brake system. A magnitude of the brake force established by the brake force applying mechanism (i.e., a deceleration rate) is adjustable. For example, when the accelerator pedal is moved to the deceleration range while the vehicle travels at a high speed, the deceleration rate is increased to establish the greater brake force.

JP-A-2020-67041 describes a vehicle control system applied to a vehicle in which a one-pedal mode is available. In the one-pedal mode taught by JP-A-2020-67041, the vehicle is decelerated by depressing a brake pedal, and not only drive force but also brake force are controlled by manipulating an accelerator pedal. The vehicle control system taught by JP-A-2020-67041 is configured to obtain an operating speed of one of an accelerator pedal and a brake pedal returned to an initial position, set a target acceleration based on an operating amount of the other pedal depressed after releasing said one of the pedals, and increase a correction amount to correct the target acceleration if the operating speed of the returned pedal is fast. According to the teachings of JP-A-2020-67041, therefore, a reference range shifted toward a decelerating range to expand an accelerating range when start operating the accelerator pedal after releasing the brake pedal. For this reason, acceleration and deceleration of the vehicle can be controlled properly in line with the driver's intention, without providing uncomfortable feeling with the driver and without generating a shock.

JP-A-2001-219830 describes a deceleration control device for a vehicle configured to accelerate the vehicle smoothly after decelerating the vehicle. The deceleration control device taught by JP-A-2001-219830 is provided with an engine brake assistance means that increases a deceleration of the vehicle. Specifically, the engine brake assistance means increase the deceleration of the vehicle when a brake pedal is not operated and an operating amount of an accelerator pedal is less than a predetermined value. In addition, according to the teachings of JP-A-2001-219830, an additional deceleration established by the engine brake assistance means is restricted for a predetermined period of time when releasing the brake pedal being operated.

JP-A-2010-76584 describes an acceleration/deceleration controller for accelerating/decelerating a vehicle in line with an intention of a driver. The acceleration/deceleration controller taught by JP-A-2010-76584 comprises: a back-and-forth acceleration/deceleration control part that controls back-and-forth acceleration/deceleration of the vehicle; a correction control part that performs control interposition in the back-and-forth acceleration/deceleration control to correct the back-and-forth acceleration/deceleration; and a control interposition permission decision part that permits or forbids the control interposition by the correction control part. According to the teachings of JP-A-2010-76584, for example, such correction of deceleration is permitted when an operating amount of an accelerator pedal is less than a threshold value.

As described, the vehicles described in JP-A-H09-95222 and JP-A-2020-67041 may be propelled in the one-pedal mode in which not only the drive force but also the brake force are controlled by manipulating a common pedal. Specifically, the deceleration adding device taught by JP-A-H09-95222 is configured to correct the deceleration of the vehicle by adjusting the deceleration rate in accordance with a vehicle speed when the accelerator pedal is positioned within the deceleration range. According to the teachings of JP-A-H09-95222, therefore, the deceleration of the vehicle can be controlled properly in accordance with the vehicle speed. However, as a result of adjusting the deceleration rate, the deceleration would be corrected against the driver's intention. In the vehicle of this kind, the driver manipulates the accelerator pedal, the brake pedal, and a shifting device to accelerate and decelerate the vehicle in line with his/her intention. For example, the driver would decelerate the vehicle by depressing the brake pedal during propulsion in the one-pedal mode. In this case, if the vehicle speed changes, the deceleration rate would be changed unintentionally to correct the deceleration of the vehicle. As a result, the driver may feel uncomfortable feeling when operating the vehicle in the one-pedal mode again.

SUMMARY

Aspects of the present disclosure have been conceived noting the foregoing technical problems, and it is therefore an object of the present disclosure to provide a vehicle control system configured to decelerate a vehicle properly according to a driver's intention, even if the driver decelerates the vehicle by operating a brake pedal during propulsion in the one-pedal mode, and then the vehicle is propelled in the one-pedal mode again.

The vehicle control system according to the embodiment of the present disclosure is applied to a vehicle comprising: an accelerator pedal that is operated by a driver; a brake device that applies a brake force to the vehicle; a brake pedal that is operated by the driver to actuate the brake device; and a detector that collects data relating to an operating condition and a travelling condition of the vehicle. The vehicle may be accelerated and decelerated by manipulating only the accelerator pedal, and may also be decelerated by manipulating the brake pedal. In a case of accelerating and decelerating the vehicle by manipulating only the accelerator pedal, a deceleration of the vehicle is increased with a reduction in an operating amount of the accelerator pedal as long as the operating amount of the accelerator pedal falls within a decelerating range from zero to a predetermined switching amount, and an acceleration of the vehicle is increased with an increase in the operating amount of the accelerator pedal as long as the operating amount of the accelerator pedal falls within an accelerating range from the switching amount to a maximum amount. In order to achieve that above-explained objective, according to the exemplary embodiment of the present disclosure, the vehicle control system is provided with a controller that controls the acceleration and the deceleration of the vehicle based on the data collected by the detector. According to the exemplary embodiment of the present disclosure, the controller is configured to: control the deceleration of the vehicle based on a deceleration level set in accordance with a speed of the vehicle while the vehicle is operated by manipulating only the accelerator pedal; and update the deceleration level based on an operation of the brake pedal if the brake pedal is manipulated to decelerate the vehicle, while the vehicle is operated by manipulating only the accelerator pedal and the operating amount of the accelerator pedal falls within the decelerating range.

In a non-limiting embodiment, the controller may be further configured to update the deceleration level when an operating amount of the brake pedal is reduced equal to or less than a predetermined minimum reference value after decelerating the vehicle by manipulating the brake pedal.

In a non-limiting embodiment, the controller may be further configured to update the deceleration level such that the deceleration of the vehicle is increased with a reduction in the operating amount of the brake pedal.

In a non-limiting embodiment, the controller may be further configured to reduce a shifting amount to update the deceleration level with a reduction in the operating amount of the brake pedal.

In a non-limiting embodiment, the controller may be further configured to reduce a shifting rate to shift the deceleration level with a reduction in a returning speed of the brake pedal, when updating the deceleration level.

In a non-limiting embodiment, the controller may be further configured to start a calculation of the returning speed of the brake pedal when the operating amount of the brake pedal is reduced equal to or less than a predetermined value.

Thus, according to the exemplary embodiment of the present disclosure, the vehicle may be operated by manipulating only the accelerator pedal in a so-called "one pedal mode". In the one pedal mode, the deceleration of the vehicle is controlled based on the deceleration level set in such a manner that the maximum deceleration of a case in which an operating amount of the accelerator pedal is zero is reduced with a reduction in a speed of the vehicle. For example, if a required force governed by a vehicle speed and a position of the accelerator pedal is less than a threshold value, the deceleration of the vehicle is controlled based on the current deceleration level. By contrast, if the required drive force is equal to or greater than the threshold value, the deceleration is controlled based on the deceleration level corresponding to the vehicle speed at a point when the required drive force will be reduced less than the threshold value again. Thus, the vehicle control system according to the exemplary embodiment of the present disclosure is configured to set different deceleration levels (i.e., target decelerations) with respect to speed ranges of the vehicle. Specifically, the deceleration levels are set in such a manner that the deceleration is reduced with a reduction in the speed of the vehicle. When decelerating the vehicle propelling in the one-pedal mode, the deceleration of the vehicle is controlled based on the deceleration level corresponding to the speed of the vehicle at a point when the accelerator pedal is returned. During propulsion in the one-pedal mode, the accelerator pedal would be operated frequently in a low-speed range. Therefore, if the delectation to be established in the low-speed range is large, the deceleration would be changed significantly in response to an operation of the accelerator pedal. This makes it difficult to decelerate the vehicle during propulsion in the one-pedal mode. In order to avoid such disadvantage, according to the exemplary embodiment of the present disclosure, the deceleration levels are set in such a manner that the deceleration is reduced with a reduction in the vehicle speed. According to the exemplary embodiment of the present disclosure, therefore, the vehicle can be decelerated smoothly during propulsion in the one-pedal mode. If the required drive force is less than the threshold value, that is, if the driver does not intend to accelerate the vehicle or the intension of the driver to accelerate the vehicle is weak, the deceleration is controlled based on the current deceleration level. Specifically, the deceleration level which has been set when the accelerator pedal is returned last time is maintained, and the deceleration is controlled based on the deceleration level currently set. In this case, the current deceleration level is maintained unless the accelerator pedal or the brake pedal is operated. Therefore, the deceleration of the vehicle will not be corrected unintentionally against the driver's will. Whereas, if the required drive force is equal to or greater than the threshold value, that is, if the driver intends to accelerate the vehicle or the intension of the driver to accelerate the vehicle is strong, the deceleration is controlled based on the deceleration level corresponding to the speed of the vehicle at the point when the required drive force will be reduced less than the threshold value again. In this case, it may be assumed that the driver feels acceleration when returning the accelerator pedal after depressing the accelerator pedal, therefore, the deceleration level is shifted to the level corresponding to the speed of the vehicle at the point when the accelerator pedal is returned. That is, in the case that the driver does not intend to accelerate the vehicle when decelerating the vehicle in the one-pedal mode, the deceleration of the vehicle is controlled to be changed smoothly. By contrast, in the case that the driver intends to accelerate the vehicle in the one-pedal mode, the deceleration of the vehicle is controlled in such a manner as to improve a deceleration feeling. According to the exemplary embodiment of the present disclosure, therefore, the deceleration of the vehicle can be established properly according to the driver's intention when controlling the brake force in the one-pedal mode.

According to the exemplary embodiment of the present disclosure, if the brake pedal is depressed during propulsion in the one-pedal mode, the deceleration level for determining the target deceleration is updated based on details of operation of the brake pedal. If the vehicle is decelerated by depressing the brake pedal during propulsion in the one-pedal mode, the vehicle speed would be reduced lower than the speed on which the current decelerating level is based. In this case, if the deceleration level is changed unintentionally due to such reduction in the vehicle speed, the deceleration would be changed irrespective of the operation of the brake pedal, and the driver would feel a gap between the operation of the brake pedal and an actual change in the deceleration. As a result, the driver may feel uncomfortable feeling when operating the vehicle in the one-pedal mode again. In order to avoid such disadvantage, according to the exemplary embodiment of the present disclosure, the deceleration of the vehicle is controlled taking account of the details of the operation of the brake pedal during propulsion in the one-pedal mode. To this end, a situation of the brake pedal is determined based on a depression of the brake, and the deceleration level is updated after the termination of the braking operation by manipulating the brake pedal. Otherwise, the shifting amount (i.e., the correction amount) of the deceleration level is changed depending on the depression of the brake pedal to update the deceleration level. Instead, the shifting rate of the deceleration level is changed depending on the returning speed of the brake pedal to update the deceleration level. According to the exemplary embodiment of the present disclosure, therefore, the deceleration of the vehicle may be controlled properly according to the driver's intension, even if the brake pedal is depressed during propulsion in the one-pedal mode and then the vehicle is operated by manipulating only the accelerator pedal again.

Specifically, if the brake pedal is depressed during propulsion in the one-pedal mode, the deceleration level is updated when an operating amount of the brake pedal is reduced to the predetermined minimum reference value or less. According to the exemplary embodiment of the present disclosure, therefore, the deceleration feeling as in a normal mode may be ensured even if the brake pedal is depressed during propulsion in the one-pedal mode. In this case, specifically, the deceleration level is updated after the brake pedal is returned completely. For this reason, the deceleration will not be changed against the driver's will even if the brake pedal is depressed during propulsion in the one-pedal mode.

More specifically, if the brake pedal is depressed during propulsion in the one-pedal mode, the deceleration level is updated to the higher level with a reduction in the operating amount of the brake pedal. In other words, a shifting amount of the deceleration level to update the deceleration level is reduced with a reduction in the operating amount of the brake pedal. In this case, the shifting amount may include zero. That is, the updating of the decelerating level includes an updating without shifting the deceleration level and an updating without correcting the deceleration level. That is, the shifting amount of the deceleration level is restricted if the operating amount of the brake pedal is small. According to the exemplary embodiment of the present disclosure, therefore, the deceleration will not be changed more than required even if the brake pedal is depressed during propulsion in the one-pedal mode.

In addition, in the case of updating the deceleration level in response to the operation of the brake pedal during propulsion in the one pedal mode, the shifting rate of the deceleration level is reduced with a reduction in the returning speed of the brake pedal. According to the exemplary embodiment of the present disclosure, therefore, the deceleration may be changed in proportion to the operating speed of the brake pedal. For this reason, the vehicle can be decelerated smoothly by manipulating the brake pedal during propulsion in the one-pedal mode.

In order to shift the deceleration level in accordance with the returning speed of the brake pedal, a calculation of the returning speed of the brake pedal is commenced when the operating amount of the brake pedal is reduced to the predetermined value or less. In order to reflect a most recent intention of the driver to decelerate the vehicle (i.e., a deceleration rate) in the deceleration control, specifically, the predetermined value is set to a smallest operating amount of the brake pedal within an operating range of the brake pedal where the driver may sense a change in the deceleration. That is, the returning speed of the brake pedal can be calculated within a period from a point at which the brake torque is reduced to the predetermined value or smaller to a point at which the brake pedal is returned completely. According to the exemplary embodiment of the present disclosure, therefore, the deceleration level can be shifted in accordance with a change in the deceleration corresponding to the returning speed of the brake pedal within the aforementioned period. For this reason, the deceleration may be changed at an intended rate of the driver when the vehicle is operated in the one pedal mode after decelerating the vehicle by manipulating the brake pedal.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Embodiments of the present disclosure will now be explained with reference to the accompanying drawings. Note that the embodiments shown below are merely examples of the present disclosure which should not limit a scope of the present disclosure.

Figure 1:
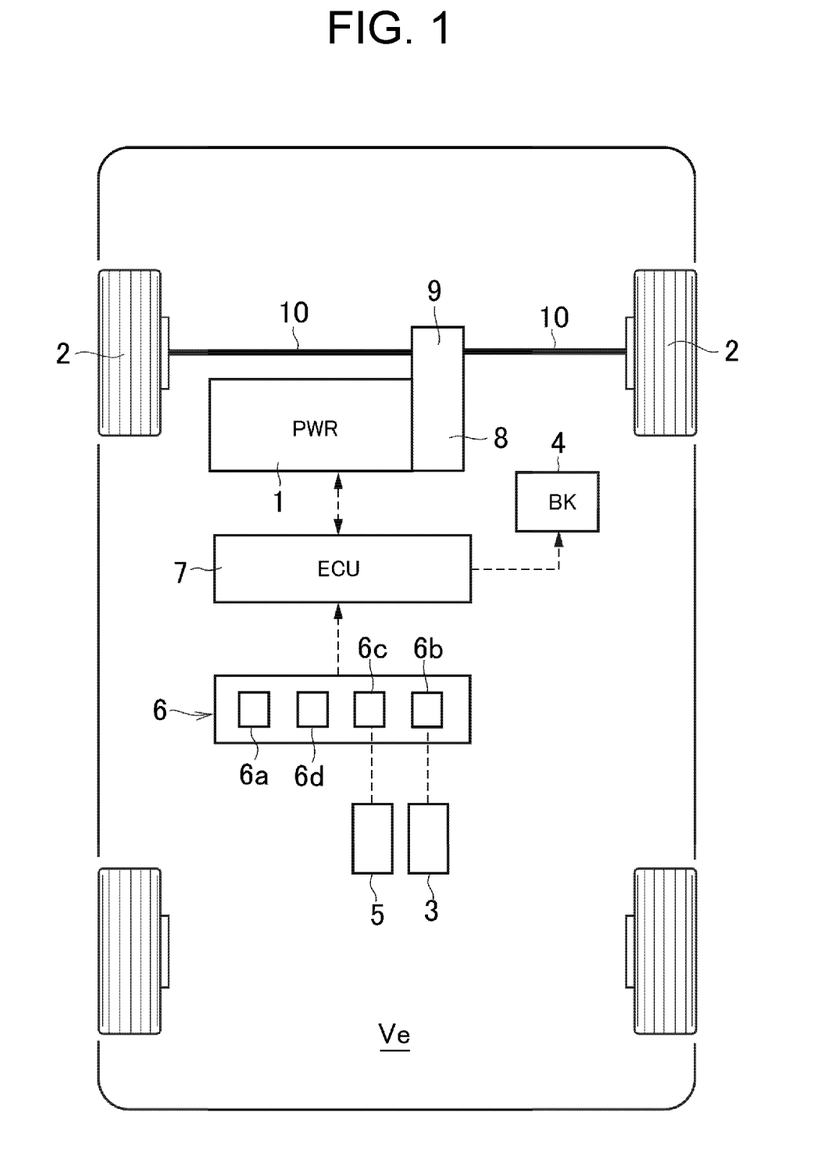
FIG. 1 is a schematic illustration showing one example of a structure of a vehicle to which the control system according to the embodiment of the present disclosure is applied.

Referring now to FIG. 1, there is shown one example of a drive system and a control system of a vehicle Ve to which the vehicle control system according to the exemplary embodiment of the present disclosure is applied. The vehicle Ve comprises a prime mover (referred to as "PWR" in FIG. 1) 1, a pair of drive wheels 2, an accelerator pedal 3, a brake device (referred to as "BK" in FIG. 1) 4, a brake pedal 5, a detector 6, and an electronic control unit (referred to as "ECU" in FIG. 1) 7 as a controller.

For example, an internal combustion engine such as a gasoline engine and a diesel engine may be adopted as the prime mover 1. An output power of the engine may be adjusted electrically, and the engine may be started and stopped electrically according to need. Given that the gasoline engine is adopted as the prime mover 1, an opening degree of a throttle valve, an amount of fuel supply or fuel injection, a commencement and a termination of ignition, an ignition timing etc. may be controlled electrically. Otherwise, given that the diesel engine is adopted as the prime mover 1, an amount of fuel injection, an injection timing, an opening degree of a throttle valve of an EGR (Exhaust Gas Recirculation) system etc. may be controlled electrically. Further, an electric motor such as a permanent magnet type synchronous motor and an induction motor may also be adopted as the prime mover 1. Those kinds of motors may serve not only as a motor to generate torque when driven by electricity suppled thereto, but also as a generator to generate electricity when rotated by a torque applied thereto. That is, a motor-generator may also be adopted as the prime mover 1. In this case, the prime mover 1 is switched between a motor and a generator by electrically controlling the prime mover 1, and an output speed and an output torque of the prime mover 1 may be controlled electrically.

In the vehicle Ve shown in FIG. 1, a drive torque generated by the prime mover 1 is delivered to the drive wheels 2 to establish a drive force to propel the vehicle Ve. Specifically, the drive wheels 2 is connected to the prime mover 1 through a transmission 8, a differential gear unit 9, and driveshafts 10. That is, the vehicle Ve shown in FIG. 1 is a front-drive layout vehicle in which the drive torque is delivered to a pair of front wheels to establish the drive force by the front wheels. Instead, the vehicle control system according to the preferred embodiment of the present disclosure may also be applied to a rear-drive layout vehicle in which the drive torque is delivered to a pair of rear wheels through a propeller shaft (not shown) to establish the drive force by the rear wheels. Further, the vehicle control system according to the preferred embodiment of the present disclosure may also be applied to and a four-wheel drive layout vehicle in which the drive torque is delivered to both front and rear wheels to establish the drive force by all wheels.

The vehicle Ve is accelerated by manipulating the accelerator pedal 3. Given that the internal combustion engine is adopted as the prime mover 1, an opening degree of a throttle valve of the gasoline engine or a fuel injection to the diesel engine is increased with an increase of an operating amount (i.e., a depression) of the accelerator pedal 3 to increase a drive torque, and as a result, a drive force to propel the vehicle Ve is increased. By contrast, the opening degree of the throttle valve is reduced to reduce the drive torque by returning the accelerator pedal 3, and as a result, the drive force to propel the vehicle Ve is reduced. In addition, a brake force to decelerate the vehicle Ve is increased with a reduction in the drive force. That is, an engine braking force derived from a friction torque and a pumping loss counteracting the drive torque is established by returning the accelerator pedal 3. Otherwise, given that the electric motor is adopted as the prime mover 1, the electric motor serves as a brake to establish a regenerative braking force when the accelerator pedal 3 is returned.

Thus, the drive force and the brake force are changed by manipulating the accelerator pedal 3. In order to detect an operating amount and an operating speed of the accelerator pedal 3, the vehicle Ve is provided with an accelerator sensor 6*b*. Specifically, an opening degree of the throttle valve governed by a position of the accelerator pedal 3 is detected by the accelerator sensor 6*b*. In addition, an operating condition and an operating direction of the accelerator pedal 3 may also be obtained based on an operating speed of the accelerator pedal 3 detected by the accelerator sensor 6*b*. That is, it is possible to determine whether the accelerator pedal 3 is being depressed or returned by a driver.

The brake device 4 is actuated to establish a brake force applied to the vehicle Ve, and for example, a hydraulic disc brake and a drum brake may be adopted as the brake device 4. According to the exemplary embodiment of the present disclosure, the brake device 4 is controlled by the controller 7. In the after-mentioned one-pedal mode, the brake device 4 is actuated to establish the brake force in accordance with an operating condition and an operating amount of the accelerator pedal 3. As described, the vehicle Ve is equipped with the brake pedal 5 so that the brake device 4 is actuated to establish the brake force by depressing the brake pedal 5. That is, an operating mode of the vehicle Ve may be selected from a normal mode and the one-pedal mode. In order to detect an operating amount (i.e., a depression) and an operating speed of the brake pedal 5, the brake pedal 5 is equipped with a brake stroke sensor 6*c*. In addition, an operating condition and an operating direction of the brake pedal 5 may also be obtained based on an operating speed of the brake pedal 5 detected by the brake stroke sensor 6*c*. That is, it is possible to determine whether the brake pedal 5 is being depressed or returned by the driver.

Instead of the brake stroke sensor 6*c*, a brake switch (not shown) may also be employed to detect an operating condition of the brake pedal 5 including an actuation of the brake device 4 and a depression of the brake pedal 5. Optionally, in the vehicle Ve shown in FIG. 1, a brake lever or brake handle (neither of which are shown) which is operated manually by the driver may also be employed instead of the brake pedal 5.

The detector 6 includes a power source, a microcomputer, various kinds of sensors, an input-output interface and so on, and the detector 6 collects various kinds of data and information to control the vehicle Ve. According to the exemplary embodiment of the present disclosure, the detector 6 comprises: a wheel speed sensor 6*a* that detects a rotational speed of each wheel; and the accelerator sensor 6*b* that detects a position of the accelerator pedal 3 corresponding to an opening degree of the throttle valve (i.e., an operating amount) and an operating speed of the accelerator pedal 3. The detector 6 further comprises: the brake stroke sensor (or a brake switch) 6*c* that detects an operating amount (i.e., a depression) of the brake pedal 5 and a pedal force applied to the brake pedal 5; and an acceleration sensor 6*d* that detects a longitudinal acceleration of the vehicle Ve. The detector 6 is electrically connected to the controller 7 so that detection values obtained by those sensors and calculation values calculated by those devices are transmitted to the controller 7 in the form of electric signal.

The controller 7 comprises a microcomputer as its main constituent, and for example, the prime mover 1, the brake device 4, the transmission 8 and so on are controlled by the controller 7. The controller 7 performs calculation using the incident data transmitted from the detector 6, and data and formulas or the like stored in advance. Calculation results are transmitted from the controller 7 to the prime mover 1, the brake device 4, the transmission 8 and so on in the form of command signal.

Specifically, the controller 7 calculates a target drive torque to be generated by the prime mover 1 based on an operating amount of the accelerator pedal 3 detected by the accelerator sensor 6*b* and a speed of the vehicle Ve calculated based on speeds of the wheels detected by the wheel speed sensor 6a, and an output power of the prime mover 1 is controlled based on the target drive torque calculated by the controller 7. A speed ratio (or a gear stage) of the transmission 8 is also controlled by the controller 7. Further, the drive force and the brake force to accelerate and decelerate the vehicle Ve are also controlled by the controller 7 based on the operating amount and the operating speed of the accelerator pedal 3 detected by the accelerator sensor 6b. The brake force applied to the vehicle Ve may also be controlled based on an operating amount of the brake pedal 5 and a pedal force applied to the brake pedal 5. Although only one controller 7 8 is depicted in FIG. 1, a plurality of controllers may be arranged in the vehicle Ve to control the specific devices individually.

As described, the vehicle Ve may be propelled in the one-pedal mode in which not only the drive force but also the brake force are changed in accordance with an operating amount of the accelerator pedal 3. Whereas, in the normal mode, the drive force and the brake force are controlled in accordance with operating amounts of the accelerator pedal 3 and the brake pedal 5. Thus, the operating mode of the vehicle Ve may be selected from the one-pedal mode and the normal mode.

The vehicle control system according to the exemplary embodiment of the present disclosure may also be applied to a vehicle that is operated only by an accelerator pedal, and a brake pedal is operated subsidiarily to decelerate the vehicle only in case of emergency.

Figure 4:
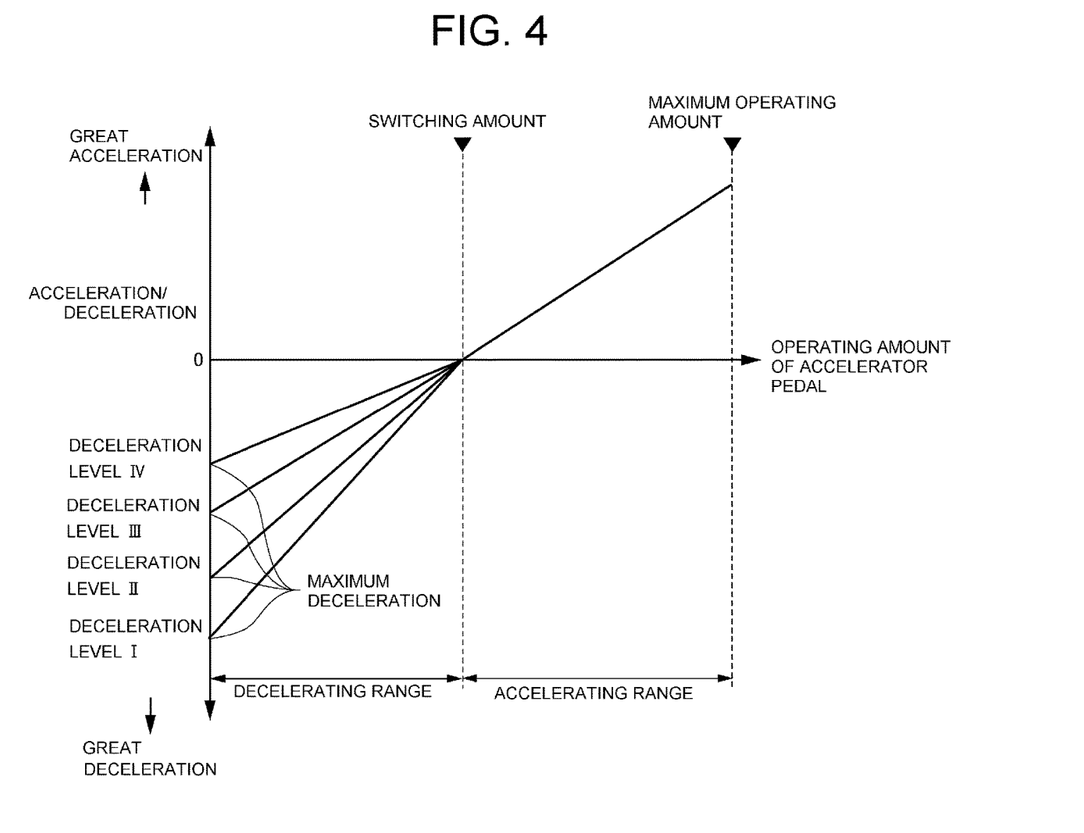
FIG. 4 is a map determining a decelerating range and an acceleration range of an accelerator pedal, and determining the deceleration levels within the decelerating range.

In the one-pedal mode, specifically, a range of movement of the accelerator pedal 3 is divided into a decelerating range in which a depression of the accelerator pedal 3 is relatively small, and an accelerating range in which a depression of the accelerator pedal 3 is relatively large across a switching amount. Specifically, as indicated in FIG. 4, a range from an initial position of the accelerator pedal 3 (i.e., a depression is 0%) to the switching position (or switching amount) is the decelerating range, and a range from the switching position (or the switching amount) to a maximum position of the accelerator pedal 3 (i.e., a depression is 100%) is the accelerating range. Given that the accelerator pedal 3 is positioned within the accelerating range, the drive force to propel the vehicle Ve is increased with an increase in depression of the accelerator pedal 3.

That is, in the accelerating range, the drive force to propel the vehicle Ve is increased with an increase in an operating amount of the accelerator pedal 3 as in the normal mode. In other words, an acceleration of the vehicle Ve is increased with an increase in depression of the accelerator pedal 3.

Whereas, in the decelerating range of the one-pedal mode, the brake force to decelerate the vehicle Ve is increased with a reduction in an operating amount of the accelerator pedal 3. In other words, the deceleration of the vehicle Ve is increased with a reduction in depression of the accelerator pedal 3. As described, the brake force includes the engine braking force and the brake force established by actuating the brake device 4. Given that the prime mover 1 includes the motor-generator, the brake force further includes a brake force derived from a regenerative torque generated by the motor-generator. In the decelerating range, those brake forces are controlled cooperatively in such a manner as to achieve a required brake force. In the exemplary embodiment of the present disclosure, the "deceleration" is defined as a longitudinal acceleration acting in the negative direction, that is, in a direction to decelerate the vehicle Ve.

According to the exemplary embodiment of the present disclosure, the deceleration may be established properly in the one-pedal mode according to the driver's intention. In addition, the deceleration may be controlled properly without providing uncomfortable feeling with the driver, even if the vehicle Ve is decelerated by manipulating the brake pedal 5 during propulsion in the one-pedal mode. For these purposes, the controller 7 executed a routine shown in FIG. 2.

Figure 2:
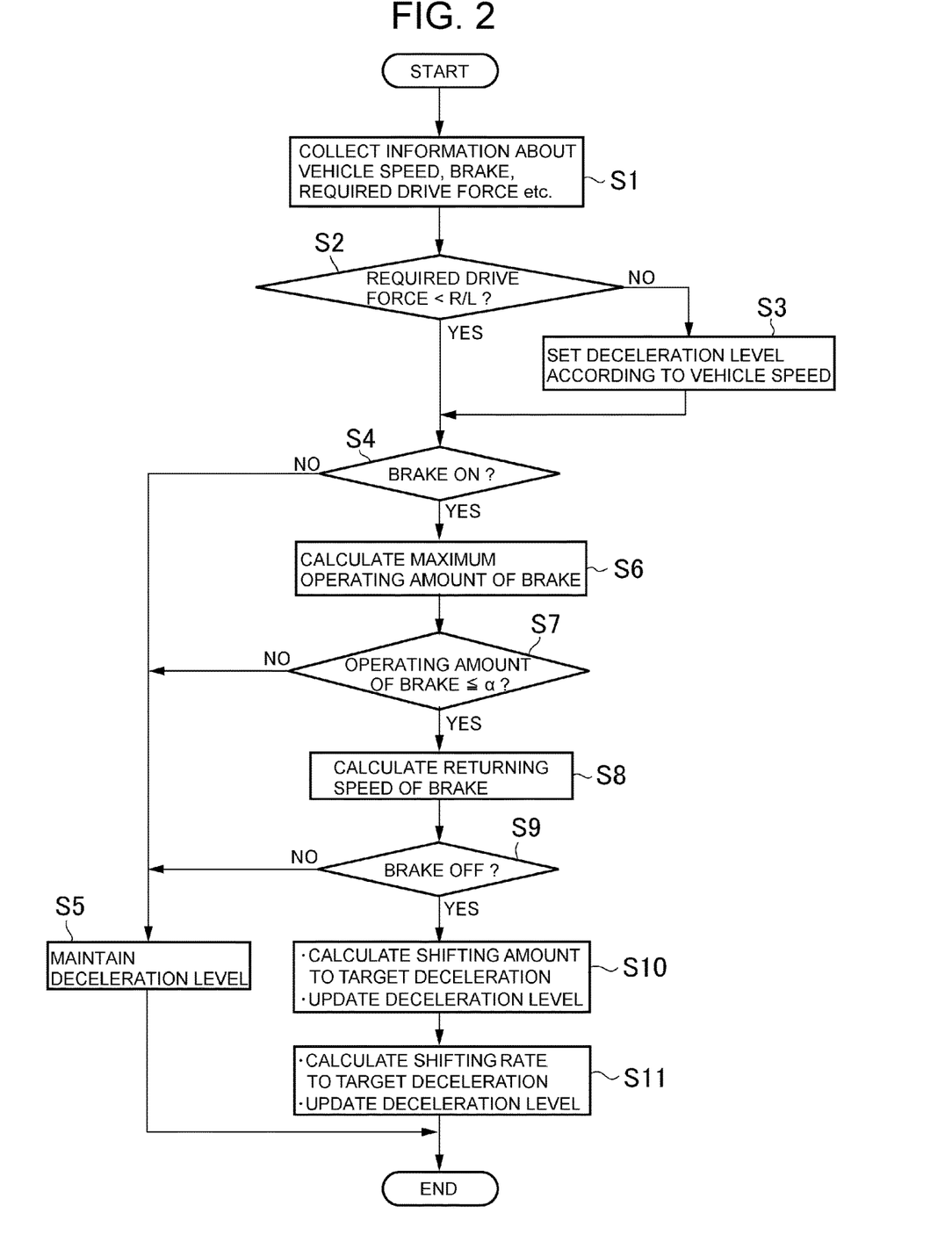
FIG. 2 is a flowchart showing one example of a routine executed by the vehicle control system according to the exemplary embodiment of the present disclosure.

The routine shown in FIG. 2 is executed during propulsion in the one-pedal mode. For example, the routine shown in FIG. 2 is commenced when the operating mode is shifted to the one-pedal mode.

At step S1, operating conditions and a travelling condition of the vehicle Ve are detected, and detection data relating to the operating conditions and travelling condition of the vehicle Ve is sent to the controller 7. For example, at step S1, an operating amount or a position of the accelerator pedal 3 and an opening degree of the throttle valve, an operating amount of the brake pedal 5, a required drive force and so on are sent to the controller 7. For example, the required drive force may be obtained based on a position of the accelerator pedal 3 and a speed of the vehicle Ve.

At step S2, it is determined whether a required drive force less than a threshold value R/L. As described, the required drive force is calculated based on an operating amount of the accelerator pedal 3 and a speed of the vehicle Ve. Specifically, the threshold value R/L is a reference value employed to determine an intention of the driver to accelerate the vehicle Ve, and to this end, the threshold value R/L is set to a value corresponding to a drive force in balance with a road load. For example, if the required drive force is equal to or greater than the threshold value R/L, the controller 7 determines that the driver intends to accelerate the vehicle Ve, or the intension of the driver to accelerate the vehicle Ve is strong. By contrast, if the required drive force is less than the threshold value R/L, the controller 7 determines that the driver does not intend to accelerate the vehicle Ve, or the intension of the driver to accelerate the vehicle Ve is weak.

If the required drive force is equal to or greater than the threshold value R/L so that the answer of step S2 is NO, the routine progresses to step S3. That is, if the driver intends to accelerate the vehicle Ve, or the intension of the driver to accelerate the vehicle Ve is strong, the routine progresses to step S3.

Figure 3:
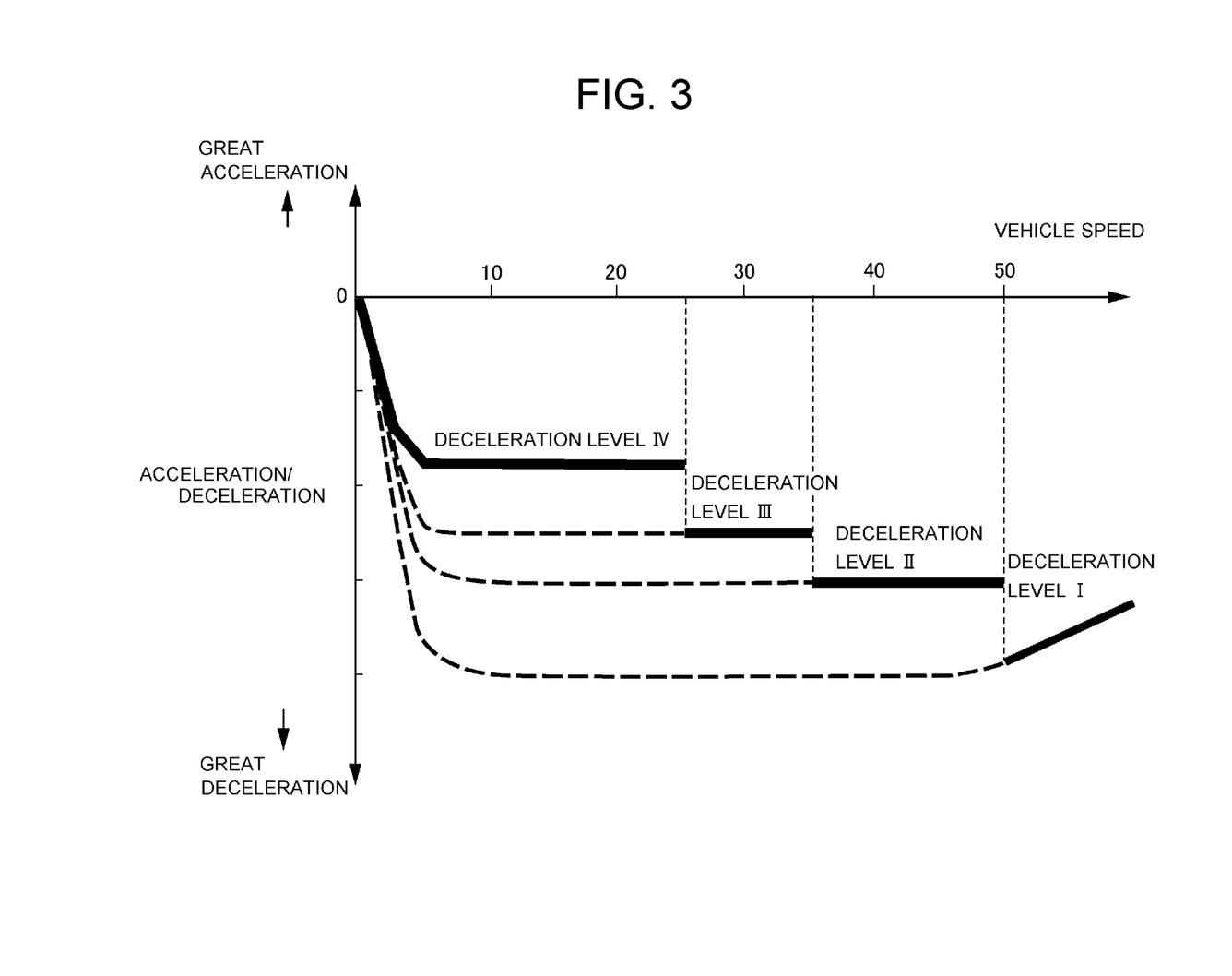
FIG. 3 is a map determining deceleration levels with respect to a speed of the vehicle.

At step S3, a deceleration level is set, and the deceleration level is shifted to a level in accordance with a speed of the vehicle Ve. Specifically, the deceleration level is a target deceleration in the one-pedal mode for controlling the deceleration within the decelerating range, and the deceleration level is set such that the maximum deceleration of a case in which an operating amount of the accelerator pedal is zero is reduced with a reduction in a speed of the vehicle Ve. According to the example shown in FIG. 3, the deceleration level is shifted among the following four levels depending on a speed of the vehicle Ve:

Speed range: 25 km/h or lower→deceleration level $IV$; (1)

Speed range: from 25 to 35 km/h→deceleration level $III$; (2)

Speed range: from 35 to 50 km/h→deceleration level $II$; (3) and

Speed range: 50 km/h or higher→deceleration level $I$. (4)

The deceleration level may also be divided into three or two levels, or five or more levels with respect to a speed of the vehicle Ve.

As indicated in FIGS. 3 and 4, the deceleration level I is a target deceleration at which the greatest deceleration is established, and the deceleration is reduced stepwise at the deceleration level II and the deceleration level III. Accordingly, the deceleration level IV is a target deceleration at which the weakest deceleration is established. As indicated in FIG. 3, the deceleration level I is set such that the target deceleration is reduced with an increase in the speed of the vehicle Ve from 50 km/h, taking account of a limitation of power regeneration of the motor-generator which may serve as the prime mover 1.

For example, when the vehicle Ve is just started up so that the routine shown in FIG. 2 is commenced, the vehicle Ve has not yet propelled and hence a speed of the vehicle Ve is still zero. In this situation, therefore, an initial value of deceleration is set to the deceleration level IV. In the second and subsequent routines, the deceleration level set finally in the previous routine is maintained and set as the initial value in the next routine.

When the required drive force is increased to the threshold value R/L or greater, the deceleration level is shifted to a level corresponding to a speed of the vehicle Ve at a point when the required drive force will be reduced less than the threshold value R/L again. The deceleration level thus set is employed as a target deceleration to control the deceleration of the vehicle Ve.

Thus, the vehicle control system according to the exemplary embodiment of the present disclosure is configured to set different deceleration levels (i.e., the target decelerations) with respect to speed ranges of the vehicle Ve. Specifically, the deceleration levels are set in such a manner that the deceleration is reduced with a reduction in the speed of the vehicle Ve. When decelerating the vehicle Ve propelling in the one-pedal mode, the deceleration of the vehicle Ve is controlled based on the deceleration level corresponding to the speed of the vehicle Ve at a point when the accelerator pedal 3 is returned. According to the exemplary embodiment of the present disclosure, when the vehicle Ve travels at a relatively low speed in the one-pedal mode, the deceleration level is set e.g., to the deceleration level III or the deceleration level IV at which the deceleration to be established is relatively weak. According to the exemplary embodiment of the present disclosure, therefore, the vehicle Ve is allowed to be decelerated smoothly during propulsion in the one-pedal mode.

In addition, in the case that the required drive force is equal to or greater than the threshold value R/L, that is, in the case that the driver intends to accelerate the vehicle Ve or that the intension of the driver to accelerate the vehicle Ve is strong, the deceleration is controlled based on the deceleration level corresponding to the speed of the vehicle Ve at the point when the required drive force will be reduced less than the threshold value R/L again. In this case, it may be assumed that the driver feels acceleration when returning the accelerator pedal 3 after depressing the accelerator pedal 3, therefore, the deceleration level is shifted to the level corresponding to the speed of the vehicle Ve at the point when the accelerator pedal 3 is returned. That is, in the case that the driver does not intend to accelerate the vehicle Ve when decelerating the vehicle Ve in the one-pedal mode, the deceleration of the vehicle Ve is controlled to be changed smoothly. By contrast, in the case that the driver intends to accelerate the vehicle Ve in the one-pedal mode, the deceleration of the vehicle Ve is controlled in such a manner as to improve a deceleration feeling. According to the exemplary embodiment of the present disclosure, therefore, the deceleration of the vehicle Ve can be established properly according to the driver's intention when controlling the brake force in the one-pedal mode.

Whereas, if the vehicle Ve is decelerated by manipulating the brake pedal 5 during propulsion in the one-pedal mode, the deceleration level would be shifted in response to a change in a speed of the vehicle Ve changed by manipulating the brake pedal 5. As a result, the deceleration of the vehicle Ve would be changed unintentionally and the driver may feel uncomfortable feelings. In order to avoid such disadvantage, if the vehicle Ve is decelerated by manipulating the brake pedal 5, the deceleration level is updated based on the details of operation of the brake pedal 5 including an operating amount, an operating speed, an operating period of time etc. of the brake pedal 5.

To this end, after setting the deceleration level at step S3, the routine progresses to step S4. Likewise, if the required drive force is less than the threshold value R/L so that the answer of step S2 is YES, the routine also progresses to step S4. That is, if the driver does not intend to accelerate the vehicle Ve or the intension of the driver to accelerate the vehicle Ve is weak so that the answer of step S2 is YES, the routine also progresses to step S4.

At step S4, it is determined whether the brake pedal 5 is depressed to decelerate the vehicle Ve. Specifically, at step S4, an operating amount (i.e., a depression) of the brake pedal 5 detected by the brake stroke sensor 6c is increased to a minimum reference value or greater. For example, the minimum reference value is set to a minimum operating amount of the brake pedal 5 at which a brake switch (not shown) is turned on. Specifically, if an operating amount of the brake pedal 5 is less than the minimum reference value, the controller 7 determines that the brake pedal 5 has not yet been depressed to decelerate the vehicle Ve. By contrast, if an operating amount of the brake pedal 5 is increased to the minimum reference value or greater, the controller 7 determines that the brake pedal 5 is depressed to decelerate the vehicle Ve.

If an operating amount of the brake pedal 5 is less than the minimum reference value, that is, if the brake pedal 5 has not yet been depressed so that the answer of step S4 is NO, the routine progresses to step S5 to maintain the current deceleration level.

At step S5, specifically, the deceleration level which is set at the current moment (i.e., a base deceleration level) is maintained, and the deceleration level thus maintained is employed as a target deceleration to control the deceleration of the vehicle Ve. Thereafter, the routine returns.

Thus, in the case that the required drive force is less than the threshold value R/L, and that the brake pedal 5 has not yet been depressed by the driver, the deceleration of the vehicle Ve is controlled at step S5 based on the base deceleration level. Specifically, the deceleration level which has been set when the accelerator pedal 3 was returned is maintained, and the deceleration of the vehicle Ve is controlled based on the deceleration level thus maintained. In this case, unless the driver operates the accelerator pedal 3 or the brake pedal 5 intentionally, the deceleration level is maintained to the same level so that the vehicle Ve is decelerated continuously. Thus, the deceleration level will not be changed to correct the deceleration unintentionally against the driver's will.

By contrast, if the operating amount of the brake pedal 5 is increased to the minimum reference value or greater so that the answer of step S4 is YES, the routine progresses to step S6 to calculate a maximum operating amount of the brake pedal 5.

Specifically, the maximum operating amount of the brake pedal 5 is a maximum value of an operating amount of the brake pedal 5 from a point at which an operation of the brake pedal 5 is started to a point at which the operation of the brake pedal 5 is terminated. In other words, the maximum operating amount of the brake pedal 5 is a maximum value of an operating amount of the brake pedal 5 from a point at which the brake switch is turned on to a point at which the brake switch is turned off. For example, the maximum operating amount of the brake pedal 5 may be calculated based on an operating amount and an operating speed of the brake pedal 5 detected by the brake stroke sensor 6*c*.

Then, it is determined at step S7 whether the operating amount of the brake pedal 5 is equal to or less than a predetermined value a as a threshold value to determine a reference point to trigger a calculation of a returning speed of the brake pedal 5 (i.e., a start point to measure an elapsed time). Specifically, the predetermined value a is set to a smallest operating amount of the brake pedal 5 within an operating range of the brake pedal 5 where the driver may sense a change in the deceleration. In order to reflect a most recent intention of the driver to decelerate the vehicle Ve (i.e., a deceleration rate) in the deceleration control, for example, the predetermined value a is set based on a result of a driving test or simulation. That is, when the operating amount of the brake pedal 5 is reduced to the predetermined value α or less, the controller 7 determines at step S7 to start the calculation of the returning speed of the brake pedal 5. By contrast, as long as the operating amount of the brake pedal 5 is greater than the predetermined value α, the calculation of the returning speed of the brake pedal 5 will not be started.

If the operating amount of the brake pedal 5 is greater than the predetermined value α, that is, if it is not the timing to start the calculation of the returning speed of the brake pedal 5 so that the answer of step S7 is NO, the routine also progresses to step S5 to maintain the current deceleration level.

That is, in this case, the deceleration level is not updated to reduce the deceleration. As described, at step S5, the deceleration level which is set at the current moment (i.e., the base deceleration level at which the deceleration is increased to the maximum value) is maintained, and the deceleration level thus maintained is employed as a target deceleration to control the deceleration of the vehicle Ve. Thereafter, the routine returns.

By contrast, if the operating amount of the brake pedal 5 is reduced to the predetermined value α or less, that is, if the time to start the calculation of the returning speed has come so that the answer of step S7 is YES, the routine progresses to step S8 to calculate the returning speed of the brake pedal 5.

Specifically, the returning speed of the brake pedal 5 is an operating speed to return the brake pedal 5 being depressed. For example, the returning speed of the brake pedal 5 may also be calculated based on an operating amount and an operating speed of the brake pedal 5 detected by the brake stroke sensor 6*c*. As indicated in the after-mentioned FIG. 7, the returning speed of the brake pedal 5 is calculated to be employed as a change rate (i.e., a change speed) of the brake torque controlled by the driver.

Then, it is determined at step S9 whether the brake pedal 5 is returned completely. In other words, it is determined whether a braking operation by manipulating the brake pedal 5 is terminated. At step S9, specifically, it is determined whether the operating amount of the brake pedal 5 detected by the brake stroke sensor 6*c* is reduced less than the minimum reference value. As described, the minimum reference value is also employed at the aforementioned step S4 to determine whether the brake pedal 5 is depressed. Optionally at step S9, a delta corresponding to a predetermined hysteresis may be added to the minimum reference value. At step S9, the controller 7 determines that the brake pedal 5 is still depressed by the driver as long as the operating amount is the minimum reference value or greater. That is, the controller 7 determines that the brake pedal 5 is returned completely and the braking operation by manipulating the brake pedal 5 is completed when the operating amount of the brake pedal 5 is reduced less than the minimum reference value.

If the operating amount of the brake pedal 5 is still greater than the minimum reference value, that is, if the brake pedal 5 has not yet been returned completely so that the answer of step S9 is NO, the routine also progresses to step S5 to maintain the current deceleration level.

In this case, since the braking operation by manipulating the brake pedal 5 has not yet been completed, the deceleration level is also not updated, and the deceleration level which is set at the current moment is also maintained. As described, the deceleration level thus maintained is employed as a target deceleration to control the deceleration of the vehicle Ve. Thereafter, the routine returns.

By contrast, if the operating amount of the brake pedal 5 is reduced less than the minimum reference value, that is, if the brake pedal 5 is returned completely so that the answer of step S9 is YES, the routine progresses to step S10 to calculate a shifting amount of the deceleration level to the target deceleration.

Specifically, the shifting amount is a change amount of the deceleration level or a correction amount of the deceleration level (i.e., deceleration) used to update the deceleration level to set the target deceleration. In this case, the shifting amount may include zero. That is, the updating of the decelerating level includes an updating without shifting the deceleration level and an updating without correcting the deceleration level. Then, at step S10, the deceleration level is updated based on the calculated shifting amount. Consequently, the deceleration of the vehicle Ve is controlled based on the deceleration level updated at step S10.

According to the exemplary embodiment of the present disclosure, the depression of the brake pedal 5 is categorized into three degrees such as a slight depression, an intermediate depression, and a deep depression. The degree of depression of the brake pedal 5 is determined based on an operating amount of the brake pedal 5. Specifically, the slight depression corresponds to an operating amount of the brake pedal 5 from zero to a first predetermined amount as a relatively small predetermined value near zero. The intermediate depression corresponds to an operating amount of the brake pedal 5 from the first predetermined amount to a second predetermined amount that is larger than the first predetermined amount within a normal operating range of the brake pedal 5. The deep depression corresponds to an operating amount of the brake pedal 5 equal to or larger than the second predetermined amount. The slight depression, the intermediate depression, and the deep depression are determined based on a result of a driving test or simulation.

According to the exemplary embodiment of the present disclosure, the shifting amount to update the deceleration level is set in accordance with a depression of the brake pedal 5. That is, the shifting amount of the deceleration level is set with respect to each of the above-mentioned degrees of depression of the brake pedal 5. Specifically, the shifting amount of the deceleration level is increased with an increase in a depression of the brake pedal 5 from the slight depression to the deep depression.

Figure 5:
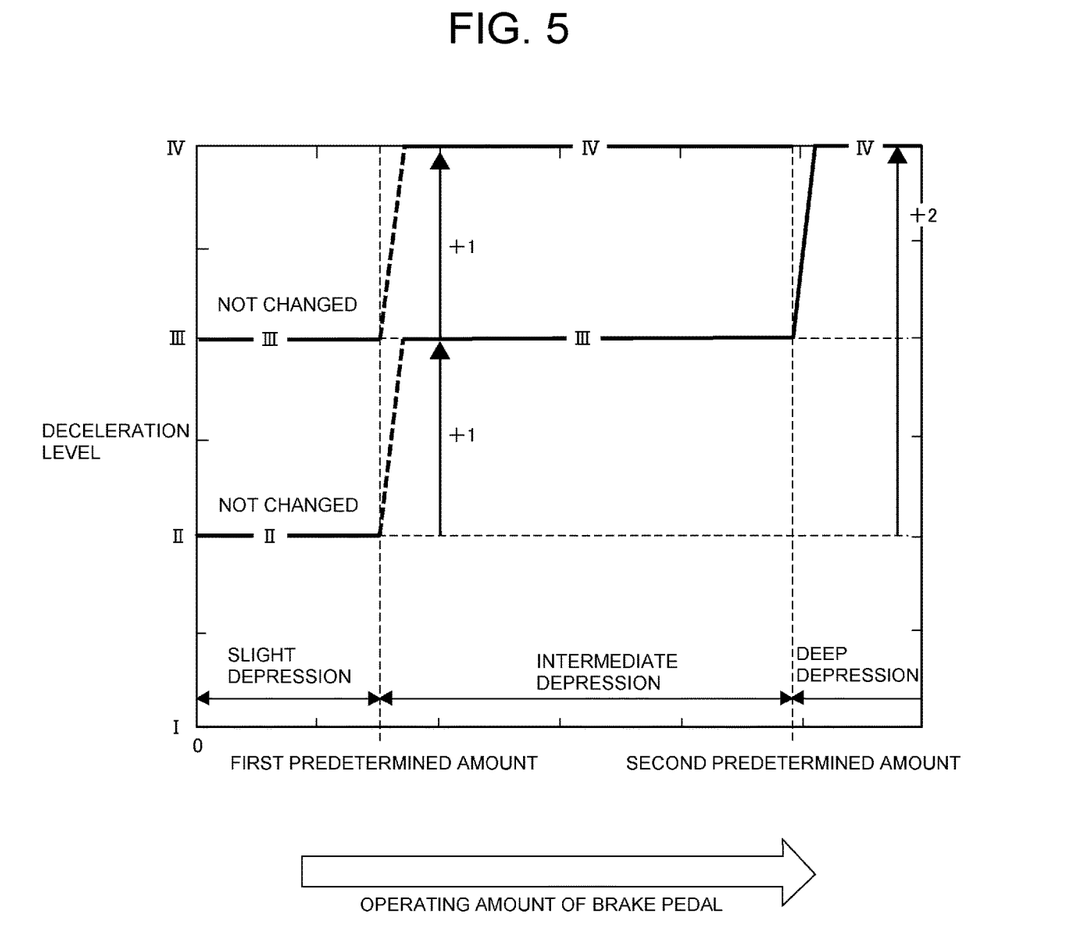
FIG. 5 is a map determining a shifting amount of the deceleration level with respect to a depression of a brake pedal.
Figure 6:
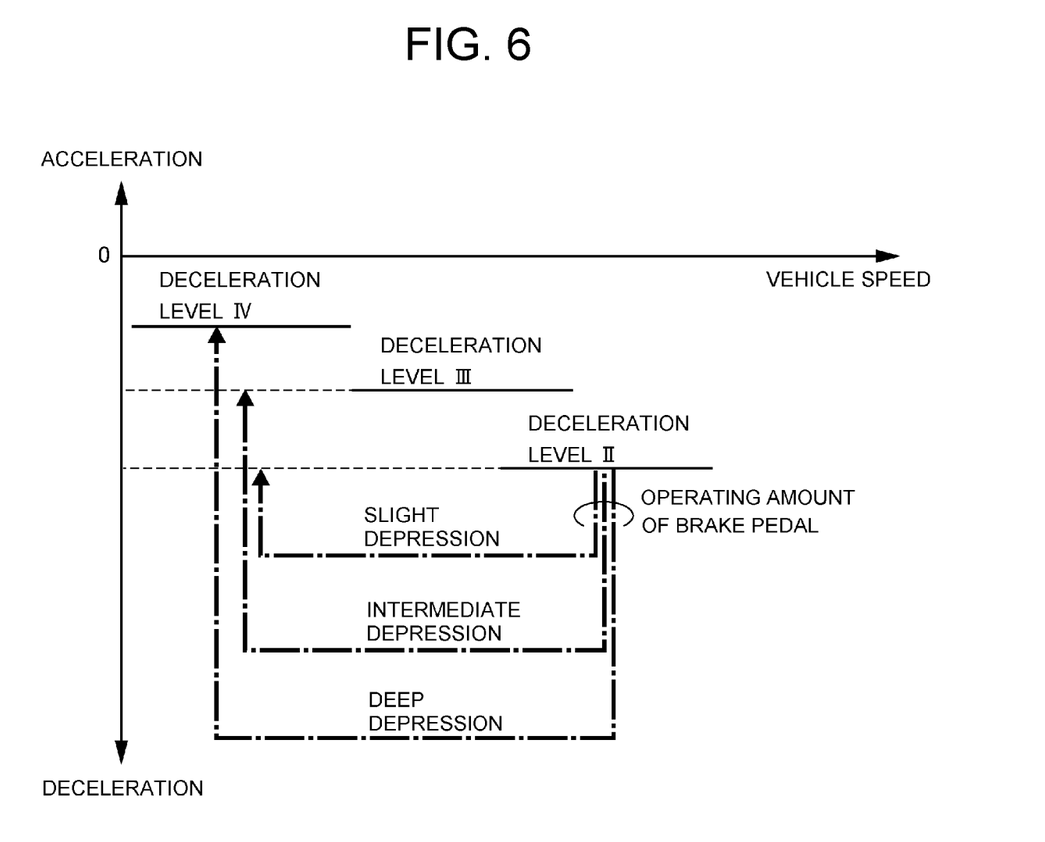
FIG. 6 is a map for shifting the deceleration level in accordance with the shifting amount.

For example, as indicated in FIG. 5, the shifting amount of the deceleration level is zero in a case that an operating amount of the brake pedal 5 is within the range of the slight depression. In this case, therefore, the deceleration range is updated without being shifted. That is, the current deceleration level is updated while being maintained. Specifically, given that the current deceleration level is II and the operating amount of the brake pedal 5 is within the range of the slight depression, as indicated in FIG. 6, the deceleration level is maintained to the level II even after being updated. In a case that an operating amount of the brake pedal 5 is within the range of the intermediate depression, the shifting amount of the deceleration level is set to +1 so as to shift the deceleration level to the level one step higher than the current level. For example, given that the current deceleration level is II and the operating amount of the brake pedal 5 is within the range of the intermediate depression, the deceleration level is updated to be shifted to the deceleration level III. In a case that an operating amount of the brake pedal 5 is within the range of the deep depression, the shifting amount of the deceleration level is set to +2 so as to shift the deceleration level to the level two steps higher than the current level. For example, given that the current deceleration level is II and the operating amount of the brake pedal 5 is within the range of the deep depression, the deceleration level is updated to be shifted to the deceleration level IV.

Then, at step S11, a shifting rate of the deceleration level to the target deceleration is calculated. Specifically, the shifting rate is a change rate (i.e., a change speed) of the deceleration level to update the deceleration level to the different level thereby setting the target deceleration.

According to the exemplary embodiment of the present disclosure, the shifting rate of the deceleration level is slowed down with a reduction in the returning speed of the brake pedal 5 toward the initial position. That is, the shifting rate of the deceleration level is changed in proportion to the returning speed of the brake pedal 5.

Figure 7:
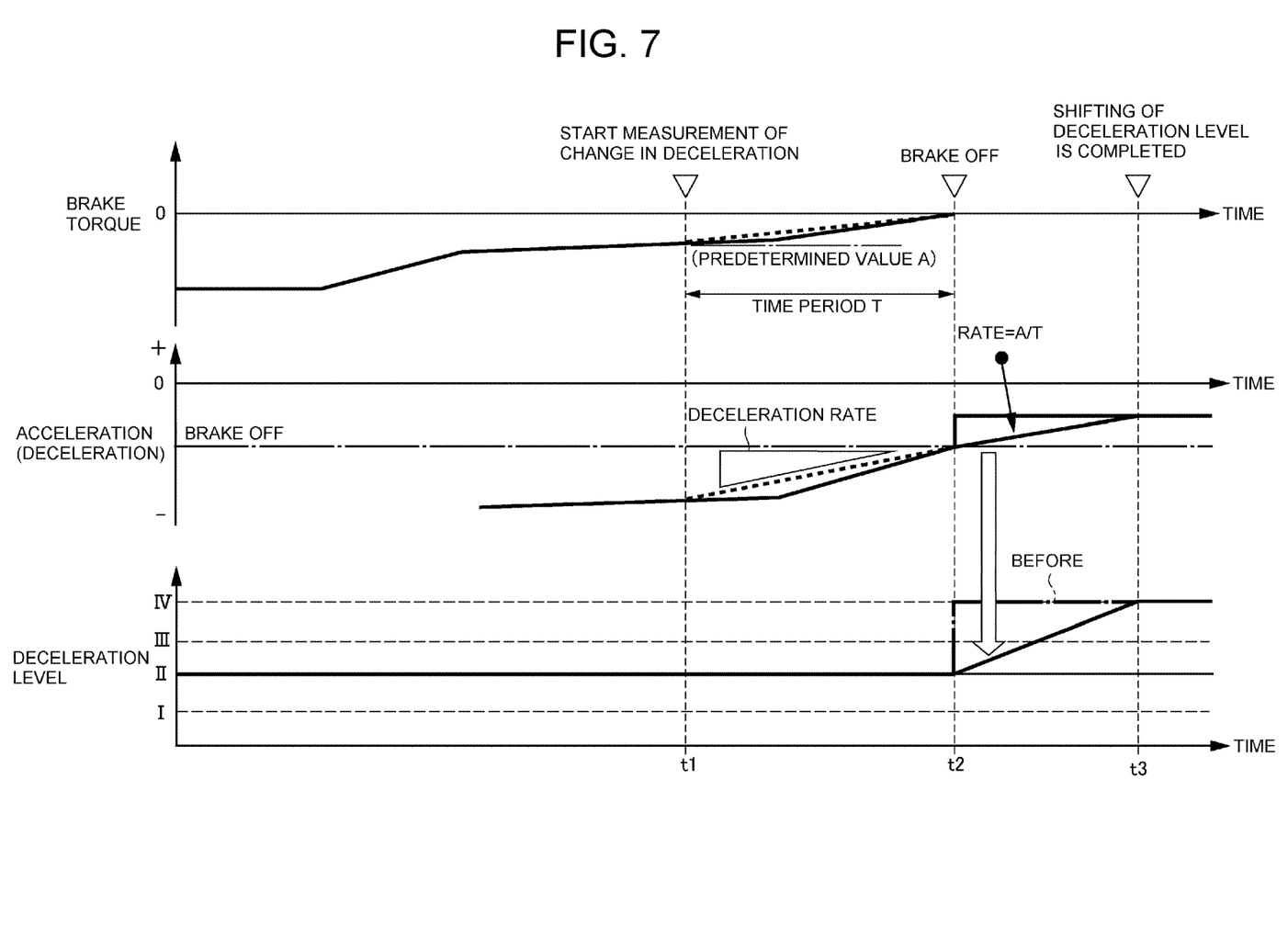
FIG. 7 is a time chart showing a process of calculating a returning speed of the brake pedal, and a process of calculating a shifting rate of the deceleration level proportional to the returning speed of the brake pedal.

As indicated in FIG. 7, the returning speed of the brake pedal 5 is calculated as a value corresponding to a change rate of the brake torque within a period from point t1 to point t2. In the example shown in FIG. 7, a measurement of a change in deceleration is started at point t1, and the brake torque is reduced toward zero from a predetermined value A. That is, at point t1, the operating amount of the brake pedal 5 is determined as the predetermined value α or less at step S7 of the routine shown in FIG. 2. In this situation, therefore, the brake torque is reduced toward zero, and the calculation of the returning speed of the brake pedal 5, that is, a measurement of an after-mentioned time period T is commenced when the brake torque is reduced smaller than the predetermined value A. Eventually, the braking operation by manipulating the brake pedal 5 is terminated so that the brake torque is reduced to zero at point t2. Specifically, the time period T is measured from point t1 at which the brake torque is reduced smaller than the predetermined value A to point t2 at which the brake pedal 5 is returned completely. Accordingly, the returning speed of the brake pedal 5 corresponds to "A/T".

In this situation, the change rate (or change speed) of the deceleration within the time period T is also calculated. Specifically, the change rate of the deceleration in this situation corresponds to the returning speed of the brake pedal 5. In other words, the change rate of the deceleration in this situation is proportional to the returning speed of the brake pedal 5. In addition, the shifting rate (i.e., a shifting speed) of the deceleration level is calculated in such a manner as to be proportional to the change rate of the deceleration within the time period T. Accordingly, the shifting rate (i.e., a shifting speed) of the deceleration level is also proportional to the returning speed of the brake pedal 5. Then, the deceleration level is shifted based on the calculated shifting rate. That is, the deceleration level is updated. Thus, in the example shown in FIG. 7, the shifting rate of the deceleration level is calculated from point t2 at which the brake pedal 5 is returned completely, and the deceleration level is shifted from level II to level IV at the shifting rate calculated by the above-explained procedures. Consequently, the shifting operation of the declaration level is completed at point t3. That is, the update of the declaration level is completed at point t3.

Here, the returning speed of the brake pedal 5 may also be calculated as a change rate of the deceleration within an arbitrary period of time while the brake pedal 5 is returned, instead of the time period T. For example, the returning speed of the brake pedal 5 may also be calculated as a change rate of the deceleration within a period from the point at which the maximum operating amount of the brake pedal 5 is calculated to the point at which the brake pedal 5 is returned completely (i.e., point t2).

Figure 8:
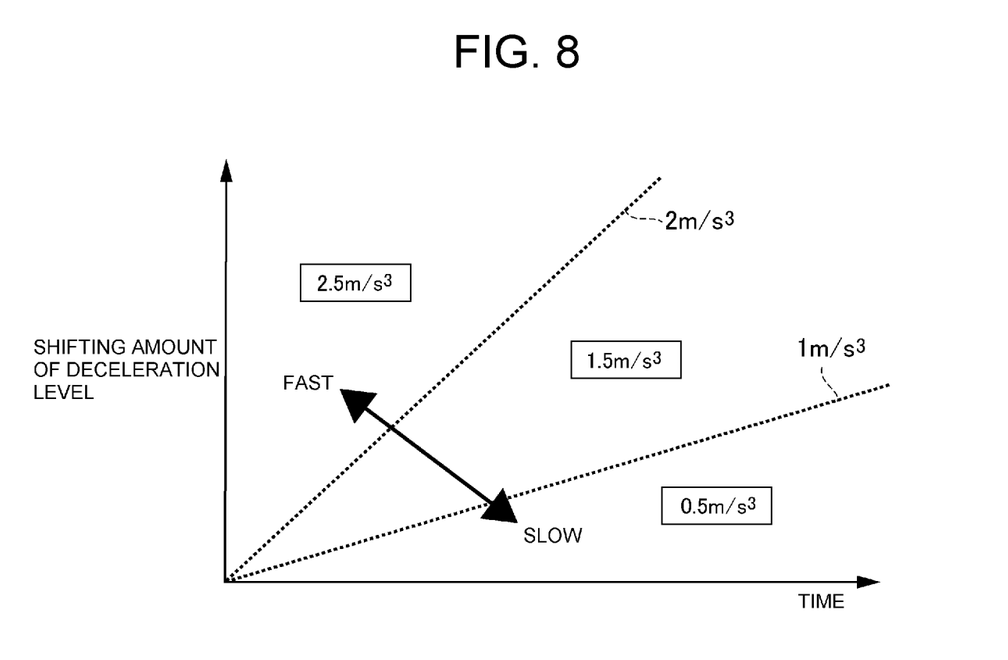
FIG. 8 is a map used to select the shifting rate from standard values in accordance with the returning speed of the brake pedal.

According to the exemplary embodiment of the present disclosure, the shifting rate of the deceleration level may also be set with reference to a map shown in FIG. 8. In the map shown in FIG. 8, a plurality of standard values such as 0.5 m/s$^3$, 1.5 m/s$^3$, and 2.5 m/s$^3$ are set across two reference values such as 1 m/s$^3$ and 2 m/s$^3$. That is, the shifting rate of the deceleration level may be shifted with reference to the map shown in FIG. 8 among 0.5 m/s$^3$, 1.5 m/s$^3$, and 2.5 m/s$^3$ with respect to the returning speed of the brake pedal 5. For example, given that the measured change rate of the deceleration is 0.8 m/s$^3$, the shifting rate of the deceleration level is set to 0.5 m/s$^3$, and the deceleration level is updated at the shifting rate thus set. For another example, given that the measured change rate of the deceleration is 2.3 m/s$^3$, the shifting rate of the deceleration level is set to 2.5 m/s$^3$, and the deceleration level is updated at the shifting rate thus set.

Thus, at step S11, the shifting rate of the deceleration level is calculated, and the deceleration level is updated at the calculated shifting rate. Consequently, the deceleration is controlled based on the deceleration level updated at step S11. Thereafter, the routine returns.

Figure 9:
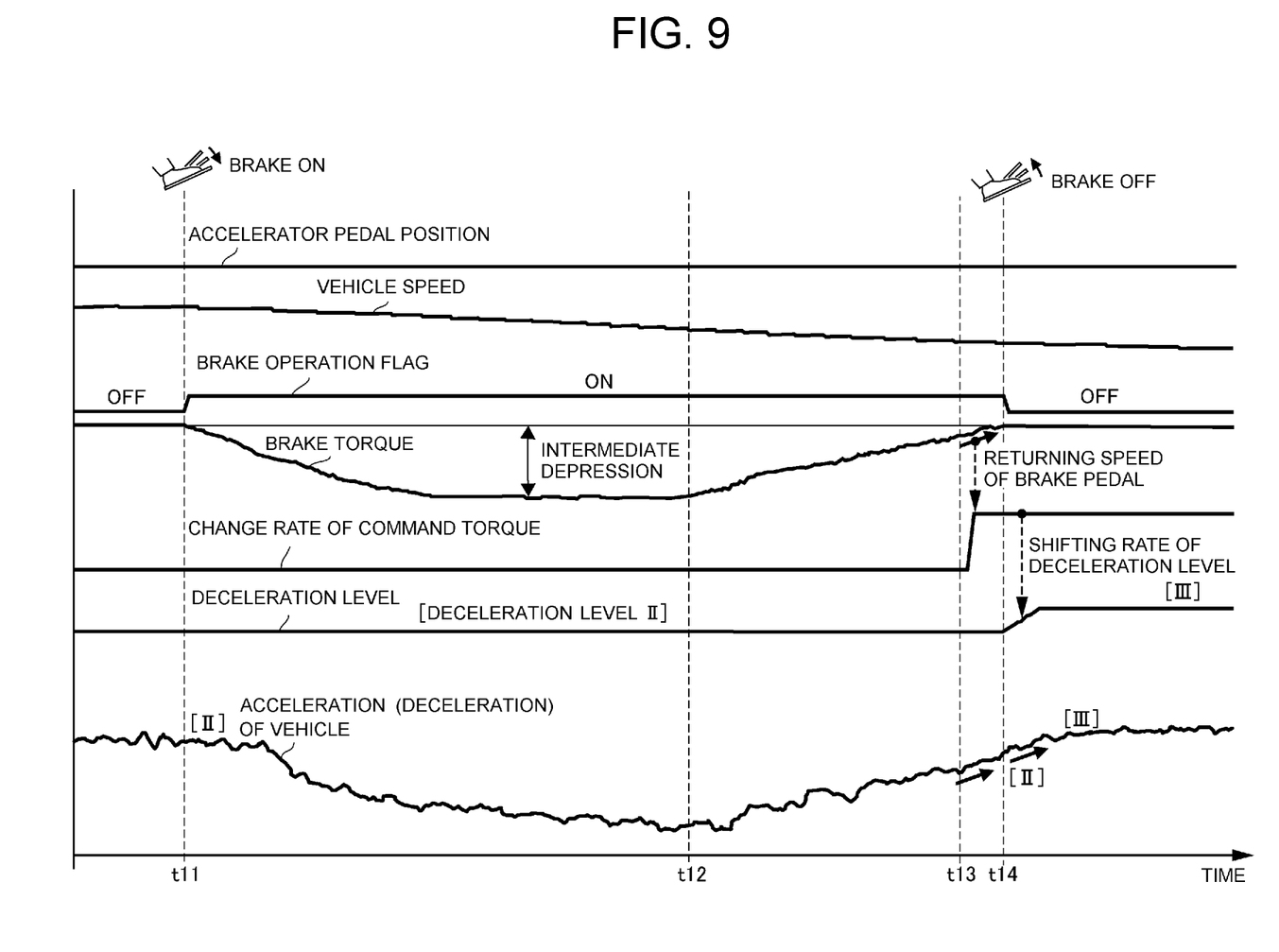
FIG. 9 is a time chart showing one example of a temporal change in the deceleration level during execution of the routine shown in FIG. 2.

Turing to FIG. 9, there are shown temporal changes in the conditions of the vehicle Ve during execution of the routine shown in FIG. 2. At point t11, the deceleration level is set to level II, and the brake pedal 5 is depressed by the driver within the range of the intermediate depression. Consequently, the brake torque and the deceleration of the vehicle Ve are increased from point t11. According to the example shown in FIG. 9, therefore, the deceleration level will be shifted from level II to level III.

The brake pedal 5 is returned from around point t12, and the brake pedal 5 is returned completely at point t14. That is, the braking operation by manipulating the brake pedal 5 is terminated at point t14. In this situation, the brake torque is reduced from the predetermined value (e.g., −60 Nm) to almost zero at point t13 which is immediately before point t14, and the returning speed of the brake pedal 5 is calculated within a period from point t13 to point t14. Then, a change rate of a command torque corresponding to the change rate of the deceleration proportional to the returning speed of the brake pedal 5 is calculated with respect to the returning speed of the brake pedal 5. In addition, the shifting rate of the deceleration level proportional to the returning speed of the brake pedal 5 is calculated with respect to the change rate of the command torque. Then, after the brake pedal 5 is returned completely at point t14, the deceleration level is shifted from level II to level III at the shifting rate calculated by the above-explained procedures.

As indicated in FIG. 9, the deceleration of the vehicle Ve is changed smoothly even if the brake pedal 5 is depressed from point t11 to point t14 during propulsion in the one-pedal mode. Especially, the deceleration of the vehicle Ve is changed preferably smoothly before and after point t14.

Thus, if the brake pedal 5 is depressed during propulsion in the one-pedal mode, the deceleration level for determining the target deceleration is updated based on details of operation of the brake pedal 5. To this end, for example, a situation of the brake pedal 5 are determined based on a depression of the brake, and the deceleration level is updated after the termination of the braking operation by manipulating the brake pedal 5. Otherwise, the shifting amount (i.e., the correction amount) of the deceleration level is changed depending on the depression of the brake pedal 5 to update the deceleration level. Instead, the shifting rate of the deceleration level is changed depending on the returning speed of the brake pedal 5 to update the deceleration level. According to the exemplary embodiment of the present disclosure, therefore, the deceleration of the vehicle Ve may be controlled taking account of the details of the operation of the brake pedal 5 during propulsion in the one-pedal mode. For this reason, the deceleration of the vehicle Ve may be controlled properly according to the driver's intension during propulsion in the one-pedal mode, without providing the driver with an uncomfortable feeling.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A vehicle control system that is applied to a vehicle comprising:
    an accelerator pedal that is operated by a driver;
    a brake device that applies a brake force to the vehicle;
    a brake pedal that is operated by the driver to actuate the brake device; and
    a detector that collects data relating to an operating condition and a travelling condition of the vehicle,
    wherein the vehicle is accelerated by manipulating the accelerator pedal, and is decelerated by manipulating the accelerator pedal or the brake pedal,
    in a case of accelerating and decelerating the vehicle by manipulating only the accelerator pedal, a deceleration of the vehicle is increased with a reduction in an operating amount of the accelerator pedal as long as the operating amount of the accelerator pedal falls within a decelerating range from zero to a predetermined switching amount, and an acceleration of the vehicle is increased with an increase in the operating amount of the accelerator pedal as long as the operating amount of the accelerator pedal falls within an accelerating range from the switching amount to a maximum amount,
    the vehicle control system further comprising:
    a controller that controls the acceleration and the deceleration of the vehicle based on the data collected by the detector, and
    the controller is configured to
    control the deceleration of the vehicle based on a deceleration level set in accordance with a speed of the vehicle while the vehicle is operated by manipulating only the accelerator pedal, and
    update the deceleration level based on an operation of the brake pedal if the brake pedal is manipulated to decelerate the vehicle, while the vehicle is operated by manipulating only the accelerator pedal and the operating amount of the accelerator pedal falls within the decelerating range,
    wherein the controller is further configured to update the deceleration level such that the deceleration of the vehicle is increased with a reduction in an operating amount of the brake pedal.

2. The vehicle control system as claimed in claim 1, wherein the controller is further configured to update the deceleration level when the operating amount of the brake pedal is reduced equal to or less than a predetermined minimum reference value after decelerating the vehicle by manipulating the brake pedal.

3. The vehicle control system as claimed in claim 1, wherein the controller is further configured to reduce a shifting amount to update the deceleration level with a reduction in the operating amount of the brake pedal.

4. The vehicle control system as claimed in claim 1, wherein the controller is further configured to reduce a shifting rate to shift the deceleration level with a reduction in a returning speed of the brake pedal, when updating the deceleration level.

5. The vehicle control system as claimed in claim 4, wherein the controller is further configured to start a calculation of the returning speed of the brake pedal when the operating amount of the brake pedal is reduced equal to or less than a predetermined value.

\* \* \* \* \*